Jan. 7, 1964   M. P. FARLEY   3,116,650
TRANSMISSION

Filed Sept. 26, 1961   4 Sheets-Sheet 1

Marvin P. Farley
INVENTOR.

BY *Clarence A. O'Brien*
and *Harvey B. Jacobson*
Attorneys

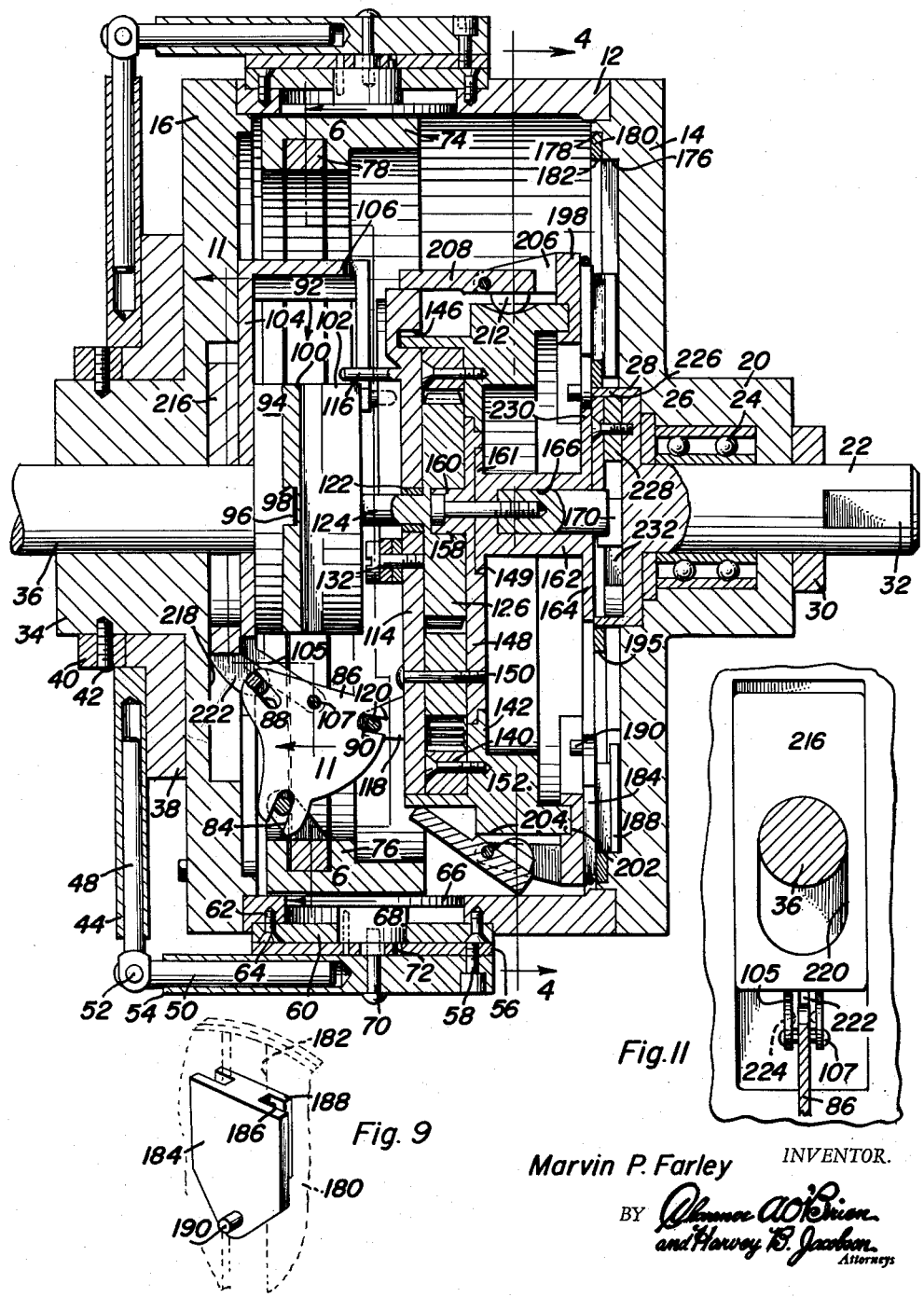

Jan. 7, 1964 — M. P. FARLEY — 3,116,650
TRANSMISSION
Filed Sept. 26, 1961 — 4 Sheets-Sheet 3

Marvin P. Farley
INVENTOR.

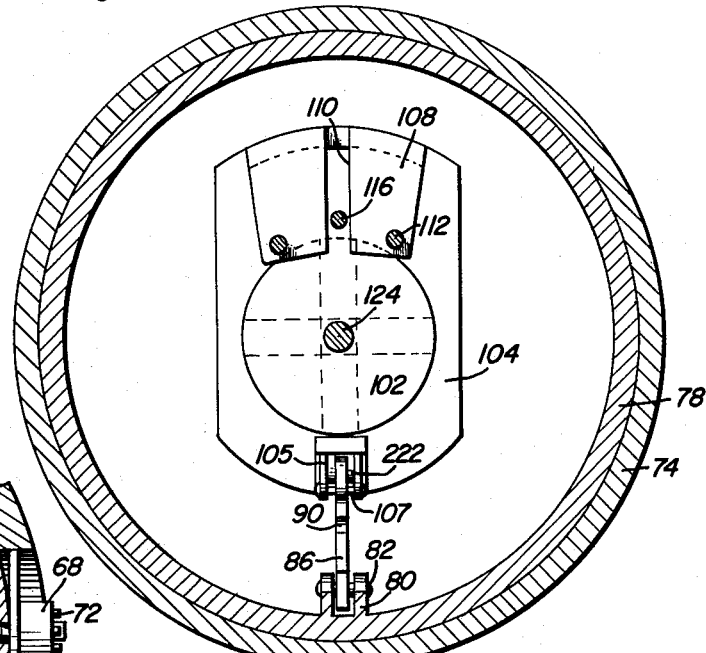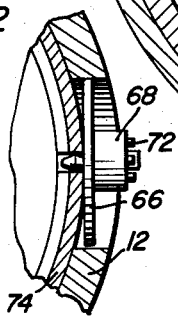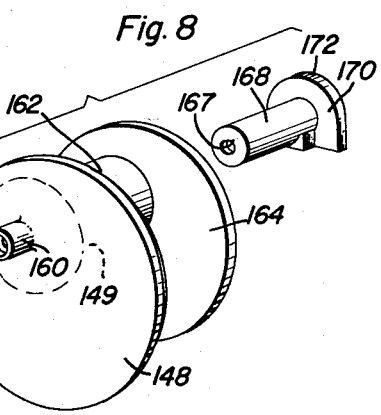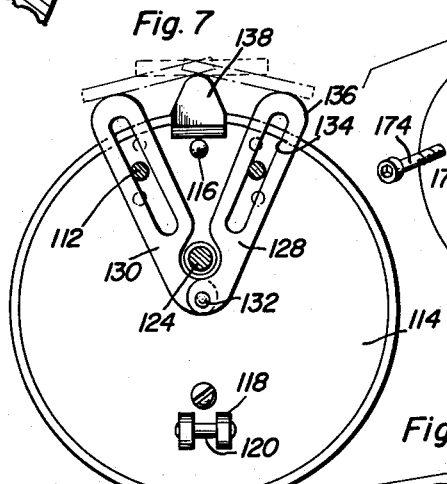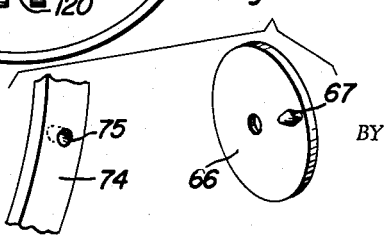

United States Patent Office 3,116,650
Patented Jan. 7, 1964

3,116,650
TRANSMISSION
Marvin P. Farley, 73 Brunswick Road, Cedar Grove, N.J.
Filed Sept. 26, 1961, Ser. No. 140,871
11 Claims. (Cl. 74—793)

The present invention generally relates to a device for transmitting power and varying the rotational speed of an output shaft in relation to an input shaft by employing constant contact gears.

The primary object of the present invention is to provide a transmission employing constant contact gears.

Another object of the present invention is to provide a transmission in accordance with the preceding object having constantly meshing gears together with means for varying the eccentricity of the rotational axes of the gears in relation to the output and input shafts.

A further important object of the present invention is to provide a transmission incorporating a constantly meshing gear assembly together with means for shifting the axis of rotation of the gears in relation to the axis of the input shaft and output shaft while maintaining the constant contacting relation and including novel means for drivingly connecting the input to the regulated or regulating gear.

Still another object of the present invention is to provide a transmission in accordance with the preceding object which is relatively simple in construction, capable of wide ratios of relative speeds and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal, vertical sectional view of the transmission illustrating the relationship of the various component parts;

FIGURE 6 is a detailed sectional view taken substantially upon a plane passing along section line 6—6 of FIGURE 3 illustrating the mechanism for adjusting the position of the Oldham coupling;

FIGURE 7 is a detailed view of the mechanism disposed adjacent the Oldham coupling;

FIGURE 8 is an exploded group perspective view of additional structural details of the invention;

FIGURE 9 is a perspective view of one of the sliding components and its relationship to the carrier plate;

FIGURE 11 is a sectional view taken substantially upon a plane passing along section line 11—11 of FIGURE 3 illustrating further structural details enabling adjustment of the transmission;

FIGURE 12 is a detailed sectional view illustrating a part of the control mechanism;

FIGURE 13 is an exploded group perspective view of the control mechanism; and

Figure 1:
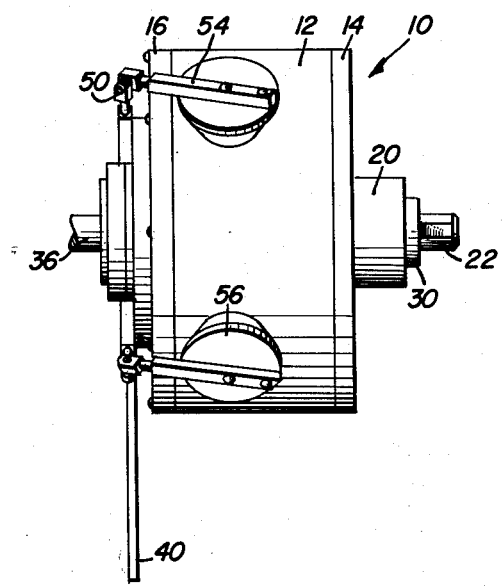
FIGURE 1 is a side elevational view of the transmission of the present invention.
Figure 2:
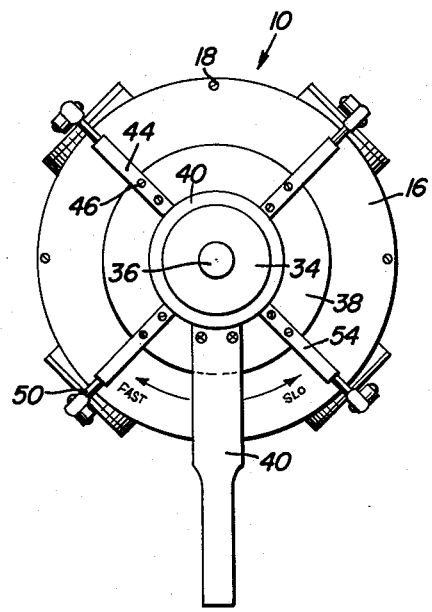
FIGURE 2 is an end view of the construction of FIGURE 1 illustrating a portion of the mechanism for varying the ratio of the transmission.
Figure 14:
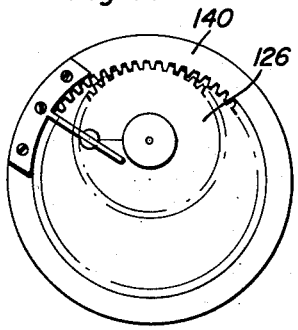
Figure 15:
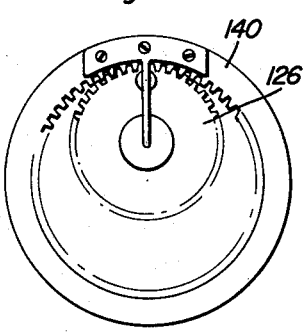
Figure 16:
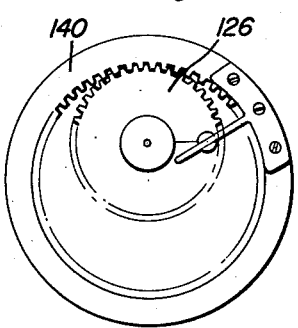
Figure 4:
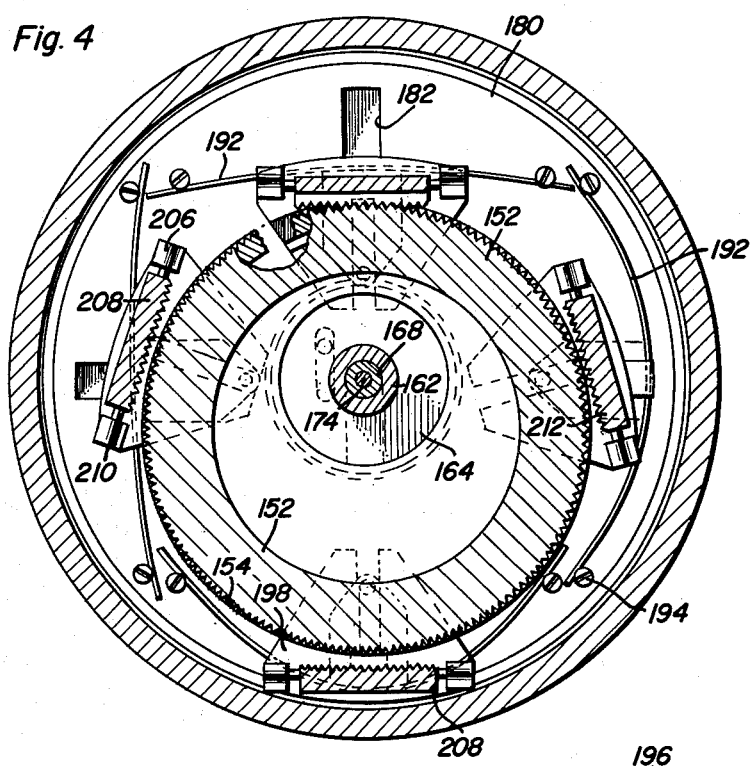
FIGURE 4 is a transverse, sectional view taken substantially upon a plane passing along section line 4—4 of FIGURE 3 illustrating the details of construction of the pawl structure.
Figure 5:
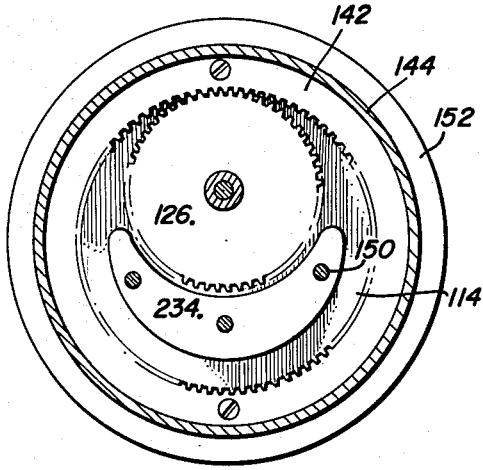
FIGURE 5 is a detailed sectional view illustrating the construction and relationship of one type of gears which are in constant meshing engagement.
Figure 10:
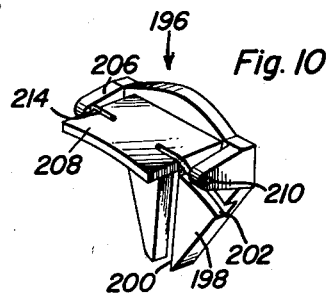
FIGURE 10 is a perspective view of one of the pawls.

FIGURES 14, 15, and 16 are progressive schematic plan views of a constantly meshing internal and external gear illustrating the basic principle of operation of the transmission of the present invention.

Referring now specially to the drawings, the numeral 10 generally designates the transmission of the present invention which includes a generally cylindrical casing 12 having removable end plates 14 and 16 thereon which are retained in position by any suitable type of fastener such as bolts 18 or the like. The end plate 14 is provided with a centrally disposed boss 20 rotatably journaling an input shaft 22. The input shaft 22 is journaled in the boss 20 by a suitable bearing assembly 24 and is provided with a circular flange 26 on the inner end thereof which engages in a recess 28 in the inner surface of the plate 14. The outer end of the shaft 22 is provided with a collar 30 which cooperates with the flange 26 to prevent longitudinal movement of the input shaft 22. Also, the input shaft may be provided with any suitable means for connection to a power source. Such means may involve a flattened area 32, a splined connection or any other suitable type of connection.

The other end plate 16 is provided with a boss 34 rotatably journaling an output shaft 36 therein having suitable means for connection with a driven member. The transmission 10 includes novel mechanism described hereinafter for varying the rotational output speed of the shaft 36 in relation to the rotational input speed of the shaft 22.

Disposed on the boss 34 is a rotatable plate 38 held thereon by a collar 40 secured in place by setscrews 42 or the like. The plate 38 is provided with a laterally extending handle 40 for rotation thereof. The handle 40 is employed for operating a control mechanism thereby varying the ratio of the output speed to the input speed and in lieu of handle 40, the control mechanism may be automatically controlled from any suitable mechanism whereby the speed ratio of the output to the input may automatically be varied in response to various conditions. For example, the ratio could be varied in response to load conditions, the speed of the output shaft or any other conditions desired.

Rigidly attached to the rotatable plate 38 is a plurality of radially extending hollow sleeves 44 secured in place by suitable fasteners 46 or the like. Each of the sleeves rotatably and slidably receives a circular rod 48 which is capable of radial movement and rotational movement in the sleeve 44. The outer end of each of the rods 48 is pivotally connected to a similar rod 50 by virtue of a pivot pin 52 whereby the rods 48 and 50 may change angular relation to each other about the pivot pin 52.

The rods 50 are slidably and rotatably received in generally longitudinally extending sleeves 54 which are fixedly secured to a circular plate 56 by fastening bolts 58 or the like.

The plates 56 are rotatable against a bearing plate 60 attached stationarily in a shouldered, circular recess 62 in the casing 12 by virtue of fasteners 64. The recess 62 rotatably receives a plate 66 having a stud 68 projecting radially outwardly through an opening in the plate 60 and being connected to the plate 56 and the sleeve 54 by virtue of a fastener 70 and a plurality of interlocking projecting pins and sockets 72 thus rigidly connecting the sleeve 44, plate 56, stud 68 and plate 66 for rotation about the axis of the stud 68 when the actuating plate 38 is rotated about the axis of the output shaft 36.

Longitudinally slidable within the interior of the casing 12 is an annular member 74 which also can rotate within the limits required for operation. The annular member 74 is provided with a pair of inwardly extending peripheral flanges 76 disposed in longitudinally spaced relation to each other and these flanges 76 receive a rotatable collar or ring 78 therebetween whereby longitudinal and rotational movement of the annular member 74 causes longitudinal movement of the ring 78 during the longitudinal and limited rotational movement of the annular member 74.

Mounted on the ring 78 is a bracket consisting of a pair of inwardly extending lugs 80 (see FIGURE 6) having a transverse pin 82 interconnecting the same for engagement with a slot 84 in a generally triangular shaped fulcrum plate 86 in which the slot 84 is disposed in one apex, a pivot hole 88 is disposed in another apex and a slot 90 disposed in the third apex. Both of the slots 84 and 90 are open ended whereby longitudinal reciprocating movement of the ring 78 will be converted to pivotal movement of the triangular plate 86 for a purpose described hereinafter.

For rotating and moving the annular member 74 in the casing 12, the rotatable plate 66 is connected with the annular member 74 by an eccentric pin and socket connection whereby rotation of the plate 66 will cause movement of the annular member 74. This connection may be any suitable type of connection such as an eccentric pin 67 on plate 69 and socket 75 in member 74. The pin 67 is generally oval-shaped which is necessary since pin 67 is off-center and the annular member 74 may rotate with respect to the casing 12.

Connected to the shaft 36 is an Oldham coupling generally designated by numeral 92 which includes a plate 94 rigid with the shaft 36. The plate 94 is provided with a transverse rib 96 slidable in a transverse groove 98 in an interemdiate plate 100. The intermediate plate 100 is provided with a rib similar to 96 perpendicular to the groove 98 and on the opposite surface thereof which is received in a transverse groove in a plate 102. The plates 94, 100 and 102 together with the interconnecting grooves and ribs represent a conventional Oldham coupling.

Rotatably mounted on the shaft 36 between the plate 94 and the end plate 16 of the casing is a carrier plate 104 extending diametrically thereof and extending outwardly beyond the Oldham coupling 92. One end of the plate 104 is provided with a longitudinally extending support member 106 extending toward the center of casing 12 and having inwardly extending spaced lugs 108 on the inner end thereof which define therebetween a radial slot 110 (see FIGURE 6). The end of each lug 108 is provided with a pin 112 projecting therefrom towards the center of casing 12, the pins 112 being parallel to each other and spaced laterally in relation to each other. The other end of carrier plate 104 is provided with a pair of inclined lugs 105 pivotally connected to the fulcrum plate 86 by pin 107.

Disposed in longitudinally spaced relation to the plate 102 of the Oldham coupling, there is provided a circular carrier plate 114 having an elongated longitudinally extending pin 116 slidably received in the slot 110. Also, the plate 114 is provided with a pair of longitudinally extending lugs 118 connected by a transverse pin 120 received in the groove 90 of the fulcrum plate 86. The pin 116 maintains the carrier plate 114 stationary as far as rotation is concerned and the carrier plate 114 is also provided with an opening having a bearing 122 therein receiving a shaft 124 rigidly connected with the plate 102 of the Oldham coupling 92 at one end and the other end of shaft 124 is integral with or rigidly affixed to an external or output gear 126.

Mounted generally at the center of the plate 114 and below shaft 124 is a pair of links 128 and 130 carried by a pivot pin or fastener 132 extending through the overlapped inner ends thereof. The links 128 and 130 each has a longitudinally elongated slot 134 therein which slidably receive the pins 112. The outer ends of the links 128 and 130 respectively are rounded to form cams 136 which extend longitudinally of the casing 12 to overlie the periphery of the carrier plate 114. Also, the carrier plate 114 is provided with a cam 138 which projects radially thereof and is disposed substantially intermediate the cams 136.

The external or output gear 126 is in meshing engagement with an internal or regulating gear 140 that is attached rigidly to an annular carrier plate 142 therefor. The carrier plate 142 is provided with a peripheral flange 144 rotatably encircling the carrier plate 114. The cam 138 on the carrier plate 114 is provided with a groove as indicated by 146 for receiving the flange 144. The center of the carrier plate 142 is provided with a separate plate designated by numeral 148 that is rigidly connected with the carrier plate 114 by a plurality of fasteners 150. Thus, the carrier plate 114 is rigid with the plate 148 and the internal gear 140 is rigid with the plate 142 thus enabling rotation of the internal gear 140 and carrier plate 142 in relation to the external gear 126, the plate 148 and the carrier plate 114.

The carrier plate 142 is provided with an annular member 152 rigid therewith. The annular member 152 is provided with peripheral teeth 154 throughout the outer periphery thereof and the annular teeth 154 are generally in the form of concave recesses generally in the form of teeth such as are found on a worm gear in that they extend concavely across the surface of the annular member 152.

The external gear 126 is provided with a socket 158 receiving a projection 160 mounted eccentrically on plate 148. The plate 148 also has a recess 149 receiving one end flange 161 on spindle 162. The other end of the spindle 162 is provided with a plate or flange 164 of circular configuration and the center of the spindle 162 is provided with a longitudinal socket or bore 166 receiving the shaft 168 which carries flange 170 which has a semi-circular edge portion 172. A fastener 174 extends longitudinally through a bore 175 in projection 160 and through the plate 148 into the bore 166 of the spindle 162 and screw threadedly engaged with a threaded bore 167 in shaft 168 thus rigidly connecting carrier plate 114, plate 148, spindle 162, shaft 168 and flange 170.

The end plate 14 is provided with a peripheral recess 176 and a larger peripheral recess 178 receiving a plate 180 having a plurality of radial slots 182 thereinto slidably mounting slide plates 184 which have side slots or grooves 186 slidably receiving the edges of the slots 182. The rear edge of groove 186 is defined by an underlying plate 188 which is received in the space defined by the recess 176 whereby the slide plate 118 may move radially in the slots 182. Each of the sliding plates 184 is provided with a projecting pin 190 at the inner end thereof which projects interiorly of the casing.

The sliding plates 184 are spring biased towards the center of the plate 180 by virtue of elongated bowed wire springs 192 having the ends thereof connected to or disposed under screw threaded fasteners 194 or the like and having the center thereof extending across the outer end edge of the sliding plates 184 thus biasing and sliding plates 184 inwardly towards the center of the plate. The slots 182 terminate in inner edges 195 which limit the inward movement of the sliding plates 184.

Slidably disposed on each of the slide plates 184 is a pawl assembly generally designated by reference numeral 196. The pawl assembly 196 includes a generally triangular plate 198 having a slot 200 therein slidably receiving the pin 190. The inner surface of the plate 198 is provided with a groove 202 rotatably receiving a flange 204 on the annular member 152. Also, the inner surface of the plate 198 is provided with a pair of projecting lugs 206 pivotally supporting an elongated arcuate plate 208 by virtue of pivot pins 210 extending through the lugs 206. The plate 208 is pivoted generally adjacent its center and the inner end of the plate 208 overlies the flange 144 and the periphery of the carrier plate 114 for engagement by the cams 138 and 136. The other end of the plate 208 is provided with a toothed segment 212 which is tangential to the periphery of the annular member 152 for meshing engagement with the gear teeth 154 thereon. A pair of axial coil springs 214 are mounted on pins 210 and have ends engaging the lugs 206 and plate 20 for biasing the segments 212 away from the annular member 152 whereupon the cams 136 and 138 engaging the inner end of the plate 208 will force the toothed segment 212 into meshing engagement with the gear teeth 154.

A counterbalance mechanism is provided for counterbalancing the offset weight of the rotating parts. The counterbalancing mechanism includes a counterbalance weight in the form of a plate 216 which is disposed between the end plate 16 and the plate 104 and is slidably disposed in a recess 218 in the end plate 16. The counterbalance plate 216 is provided with a slot 220 receiving the shaft 36 whereby the plate may shift laterally thereof. The bottom edge of the plate 216 is provided with a pair of lugs 222 having a transverse pin 224 therebetween which is received in the hole 88 in fulcrum plate 86. Due to the particular arrangement of the openings 88, 90 and 84, it will be noted that the counterbalance plate 216 moves laterally in one direction as the carrier plate 114 and the parts connected thereto moves in the other direction.

At the opposite end of the casing, the plate 26 rigid with the input shaft 22 includes a cylindrical flange 226 receiving a plate 228 and a retaining plate 230 overlying the same. The plate 228 is provided with a diametrical slot 232 slidably receiving the flange 170 on the shaft 168 thus enabling shifting of the rotational axis of the shaft 168 and the spindle 162 in relation to the shaft 22. The retaining plate 230 serves to slidably retain the flange 170 in the slot 232 and the surface of the retainer plate is flush with the inner end of flange 226 and the plate 180.

Also, the carrier plate 114 is provide with a rigid arcuate segmental member 234 disposed between the external gear 126 and the internal gear 140 and this arcuate plate 234 also forms a spacer for the plate or disc 148 in relation to the carrier plate 114.

Shifting of the annular member 74 longitudinally serves to shift the carrier plate 114 laterally thus shifting the rotational axis of the external and internal gears in relation to the input shaft 22 and the output shaft 36. Such shifting is permitted by the Oldham coupling 92 and the guiding pins interconnecting the coupling and the carrier plate 114 and also by virtue of the sliding connection between the flange 170 and the plate 26.

Power input is received from the shaft 22 and is transmitted to the carrier assembly including carrier plate 114 by virtue of the driving connection formed by the flange 170, to shaft 168, spindle 162, plate 148, spacer 234, plate 114 and internal gear 140 and this assembly governs the rotational diameter of both the gears 126 and 140 by proper spacing and containing the sliding and driving plate 228 to the external gear 126 with the pinion points containing the internal or regulating gear 140 in mesh with gear 126. The above working in conjunction with the pinioning points and due to the result of locking at the area and at the time of contact of the two gears will create a pitch diameter containing the proper number of teeth to constitute an unbroken diameter circle. The internal gear 140 is in constant meshing engagement with the external gear 126 and will drive the external gear 126 at varying speeds depending upon the eccentricity of the rotational axis of the external and internal gear in relation to the input shaft 22 and the output shaft 26. The eccentrically driven external gear 126 is connected to the output shaft 36 by virtue of the Oldham coupling 92 and the eccentric weight of the rotatable component is counterbalanced by the counterbalance member.

In studying the relationship of motions when an external gear of suitable size is rotated within an internal gear, it is found that a radial line drawn from a tooth of the internal gear will have a constant relationship to a point established on the external gear through a relatively large sector of the revolution. In order words, there is a point on the external gear where the radial lines intersect although the distance between the teeth of the two gears varies considerably. This radial line and the intersecting point constitute the basis of the new concept of gearing employed in the present invention and this same relationship between the radial line and intersecting point exists regardless of the relative motions of the two gears. FIGURES 14—15 illustrate this relationship between the gear 140 and gear 126 in which a radial member on gear 140 maintains a constant relationship to a point on the gear 126 as the internal gear 140 is rotated past the area of contact.

In considering the area of contact of the two gears plus a segment of the pitch diameter presented to the external gear, the rest of the gear area is out of contact and is not important except for control purposes. In the form of the invention illustrated, four points of pinioning are used and it is pointed out that this may be varied anywhere from three to six or more points.

If an external gear is placed on a flat surface and secured from movement and an internal gear is rotated around the external gear, there is, of course, no rotation of the external gear. This external gear represents the power delivery unit. In considering this further, suppose that the radial lines and intersecting points mentioned above are duplicated and these pinioning points are secured from movement. Then, if the external gear is released with the external gear contacting the internal gear to the extent of the same number of teeth as contained in the external gear as by rotating the external gear truly concentric, no motion will be imparted to the apparatus.

Proceeding further, the same arrangement will allow for the other extreme, that is securing the external gear in a larger circle of teeth and allowing the external gear to contact a greater number of teeth there by causing the external gear to rotate. Thus, we see that as the area and since when the teeth are in contact, the internal gear has the same speed and relative motion as the pinion plate so it thus must be locked at this time and place. In short, the present invention employs the concept of duplicating the tooth or toothed relationship in the act of placing an external gear on a flat surface when placing an internal gear around and in contact with it, and then by holding the external gear from movement, and rotating the internal gear around it said external gear thus obtaining a variable speed in the internal gear.

Also, in lieu of the operating mechanism for the annular member 74, there may be provided a single bevel ring gear encircling the casing in meshing engagement with a plurality of individual beveled pinion gears attached to the plate 66 thus enabling control of the position of the annular member 74 which controls the eccentricity of the rotating parts for varying the speed ratio. While internal and external gears in constant mesh are disclosed, it is within the purview of the present invention to use other types of gears such as two external gears, bevel gears, miter gears and the like. Also, the method of changing speed, balancing, locking and the like may be varied as desired with the essence of the present invention residing in the basic principle of operation as set forth previously.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power transmission device comprising a casing having an input shaft and an output shaft disposed in axially aligned relation, a constantly meshing regulating gear and output gear disposed in the casing, means coupling the output gear to the output shaft and enabling radial movement thereof for rotation about an axis eccentric to the axis of the output shaft, means coupling the input shaft to the regulating gear for enabling shifting of the regulating gear axis in relation to the input shaft axis, and means supporting the regulating and output gears for rotation, and means connected to the supporting means for the gears for shifting the gears laterally and varying the ratio of output speed to input speed.

2. The structure as defined in claim 1 wherein said regulating gear is provided with a lock mechanism for lockingly engaging the regulating gear at predetermined points, and cam means engaging the lock means for operating said lock means whereby the regulating gear will rotate around an output gear.

3. The structure as defined in claim 2 wherein a counterbalance mechanism is provided on the output shaft for movement in a direction opposite to the movement of the eccentrically rotating gears for counterbalancing the rotational movement thereof.

4. The structure as defined in claim 3 wherein said lock means includes a plurality of pivotal plates, means mounting the plates for radial movement in relation to the casing, said regulating gear having serration means formed on the exterior surface thereof, and teeth on each pivotal plate for engagement with the serration means thus locking the regulating gear.

5. A power transmission comprising a casing, an input shaft extending into the casing at one end, an output shaft extending into an opposite end of the casing, an output gear, a regulating gear, both of said gears being disposed in the casing and being in constant meshing engagement, laterally movable means drivingly connecting the regulating gear to the input shaft, laterally movable means drivingly connecting the output gear to the output shaft, and means operable from the exterior of the casing for shifting the eccentricity of the gears in relation to the input and output shafts.

6. The combination of claim 5 wherein said regulating gear revolves around the output gear, and lock means engaging the regulating gear for forming pinion points for movement of the regulating gear about the output gear.

7. A power transmission device comprising a casing having an input shaft and an output shaft journaled therein, an internal gear disposed in the casing, an external gear disposed in the casing and in constant meshing engagement with the internal gear, said internal gear and external gear being continuous and rigid, means coupling the external gear to the output shaft and enabling radial movement of the external gear for rotation about an axis eccentric to the axis of the output shaft, means coupling the input shaft to the internal gear for enabling shifting of the internal gear axis in relation to the input shaft axis, means supporting the internal gear and the external gear for rotation, and means connected to the supporting means for the gears for shifting the gears laterally and varying the ratio of output speed to input speed, and lock means engaging the internal gear for forming pinion points for movement of the internal gear about the external gear.

8. The structure as defined in claim 7 wherein said lock means includes a plurality of peripherally spaced plates pivotally supported from the casing, said internal gear having serrations on the periphery thereof, means mounting the plates for radial inward and outward movement in relation to the casing, each of said pivotal plates having teeth thereon for engagement with the periphery of the internal gear for locking the internal gear at pinion points thereby maintaining a constant relationship of a point established on the external gear to a radial line through a tooth of the internal gear through a relatively large sector of the revolution of the internal gear in relation to the external gear.

9. The structure as defined in claim 8 together with a counterbalance mechanism mounted in the casing for movement laterally in relation to the output shaft, means interconnecting the counterbalance mechanism and the means for shifting the gears laterally for moving the counterbalance mechanism in opposite relationship to the gears for counterbalancing the rotational movement thereof.

10. The structure as defined in claim 9 wherein said means for shifting the gears laterally and shifting the counterbalance mechanism in an opposite direction includes an annular ring disposed in the casing for longitudinal and rotational movement, means extending through the casing for moving the annular ring longitudinally and rotationally, a fulcrum plate engaging the longitudinally movable and rotatable annular member within the casing and also engaging the counterbalance mechanism and the gears for shifting the gears and the counterbalance mechanism in opposite directions upon longitudinal movement of the annular member in relation to the casing and gears.

11. The structure as defined in claim 10 wherein said internal gear and external gear are carried by a carrier plate with the external gear and the internal gear being individually associated with a portion of the carrier plate with the external gear rotatable in relation to the internal gear.

References Cited in the file of this patent

UNITED STATES PATENTS 2,825,244    Luthi _____ Mar. 4, 1958

FOREIGN PATENTS 611,207    France _____ Sept. 23, 1926
469,268    Great Britain _____ July 22, 1937